United States Patent [19]
Bartholomew et al.

[11] Patent Number: 5,250,353
[45] Date of Patent: Oct. 5, 1993

[54] ENHANCED PAPER AND PAPERBOARD BIODEGRADABILITY

[75] Inventors: Gene W. Bartholomew, Tuxedo Park; Mark D. Peterson, Central Valley; Morton S. Delozier, Claryville, all of N.Y.; Michael DeAngelis, Whippany, N.J.

[73] Assignee: International Paper Company, New York, N.Y.

[21] Appl. No.: 713,662

[22] Filed: Jun. 11, 1991

[51] Int. Cl.$^5$ .......................... B32B 5/16; C08L 3/00
[52] U.S. Cl. .................................. 428/328; 428/329; 428/330; 428/537.7; 428/543; 428/689; 428/697; 428/913; 524/47
[58] Field of Search ............ 428/328, 329, 330, 537.7, 428/543, 689, 697, 913; 524/47

[56] References Cited

U.S. PATENT DOCUMENTS

| | | | |
|---|---|---|---|
| 3,431,166 | 3/1969 | Mitzutani et al. | 162/135 |
| 3,645,769 | 2/1972 | Willey et al. | 117/16 |
| 3,647,111 | 3/1972 | Stager et al. | 220/83 |
| 3,800,977 | 4/1974 | Stager et al. | 220/83 |
| 3,859,125 | 1/1975 | Miller et al. | 117/155 UA |
| 3,966,453 | 6/1976 | Cayle et al. | 162/158 |
| 4,144,120 | 3/1979 | Eldin et al. | 428/537.7 |
| 4,283,880 | 8/1981 | Fjeldsa | 47/56 |
| 4,923,565 | 5/1990 | Fuentes et al. | 162/72 |

OTHER PUBLICATIONS

Wochenblatt Fuer Papierfabrikation, Jan. 30, 1984, pp. 49–58.

*Primary Examiner*—P. C. Sluby
*Attorney, Agent, or Firm*—Ostrager, Chong & Flaherty

[57] ABSTRACT

Paper and paperboard materials having enhanced biodegradability are produced by treatment of substrates with aqueous chemical solutions having properties which increase the decomposition of the substrates so treated. The chemical solutions consist of chemical nutrients which provide a source of alternate electron acceptors to enhance biodegradability through facultative anaerobic decomposition or chemical nutrients which, increase microbial growth on the paper or paperboard thereby enhancing decomposition of the paper or paperboard. The chemical solutions are absorbed and retained in the substrate or incorporated directly into a slurry of fibrous based material and formed into a paper product using paper making apparatus. In both instances, the methods enhance the biodegradability of the paper or paperboard so treated.

7 Claims, 10 Drawing Sheets

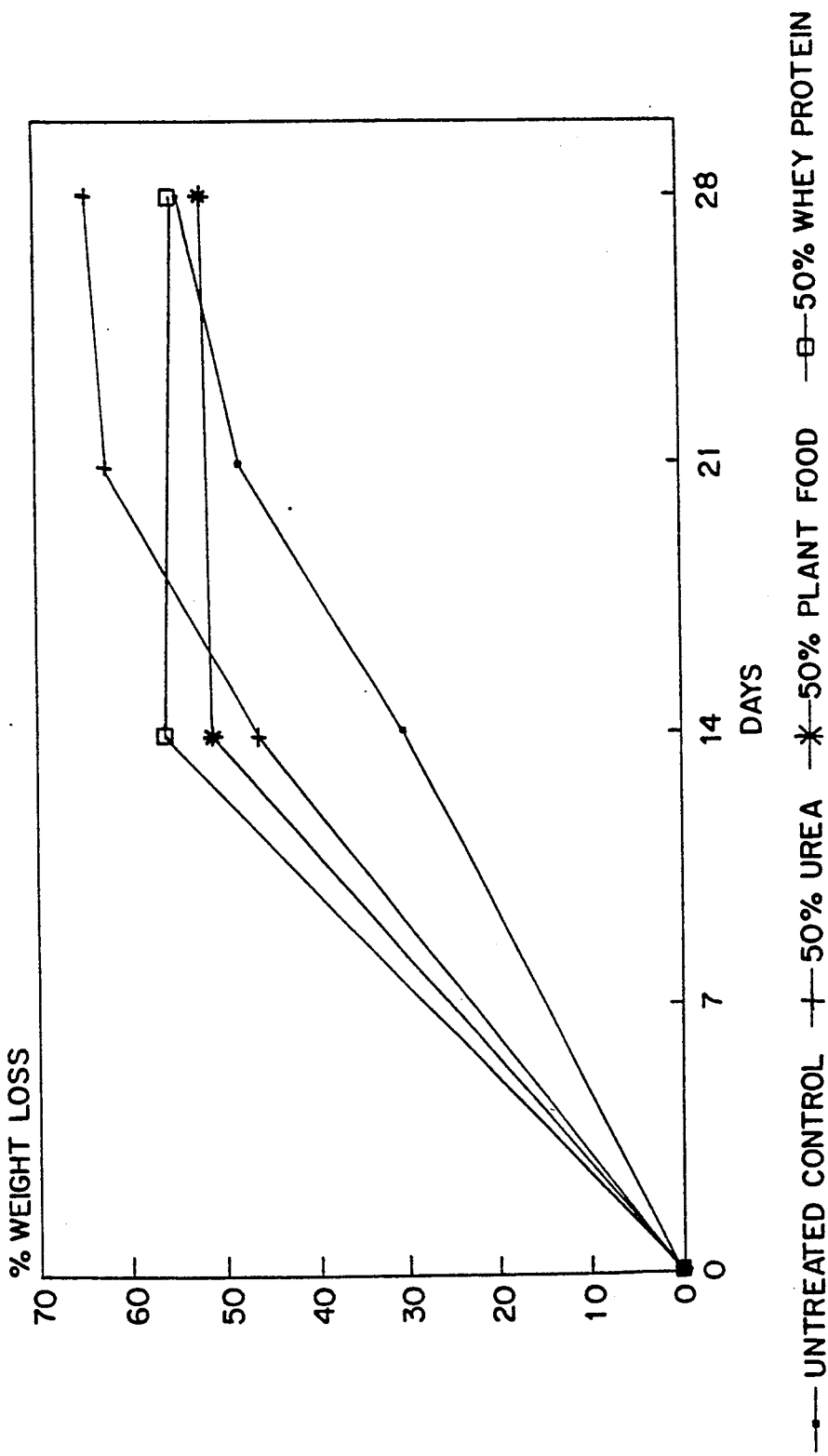
FIG. 3 EFFECT OF HIGH NUTRIENT ADD-ON LEVELS ON THE BIODEGRADATION OF PAPER 40 #/3MSF UNBLEACHED

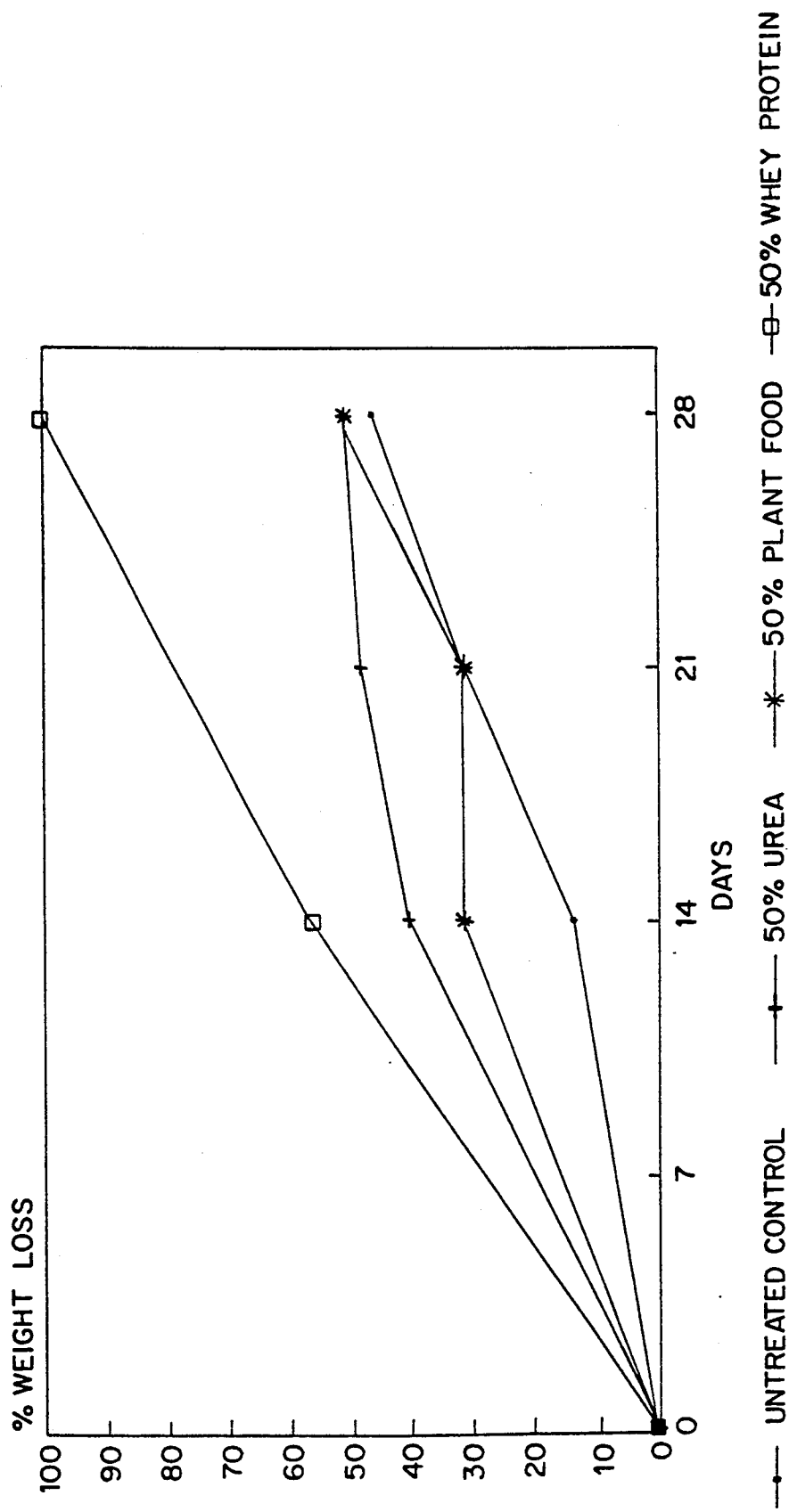

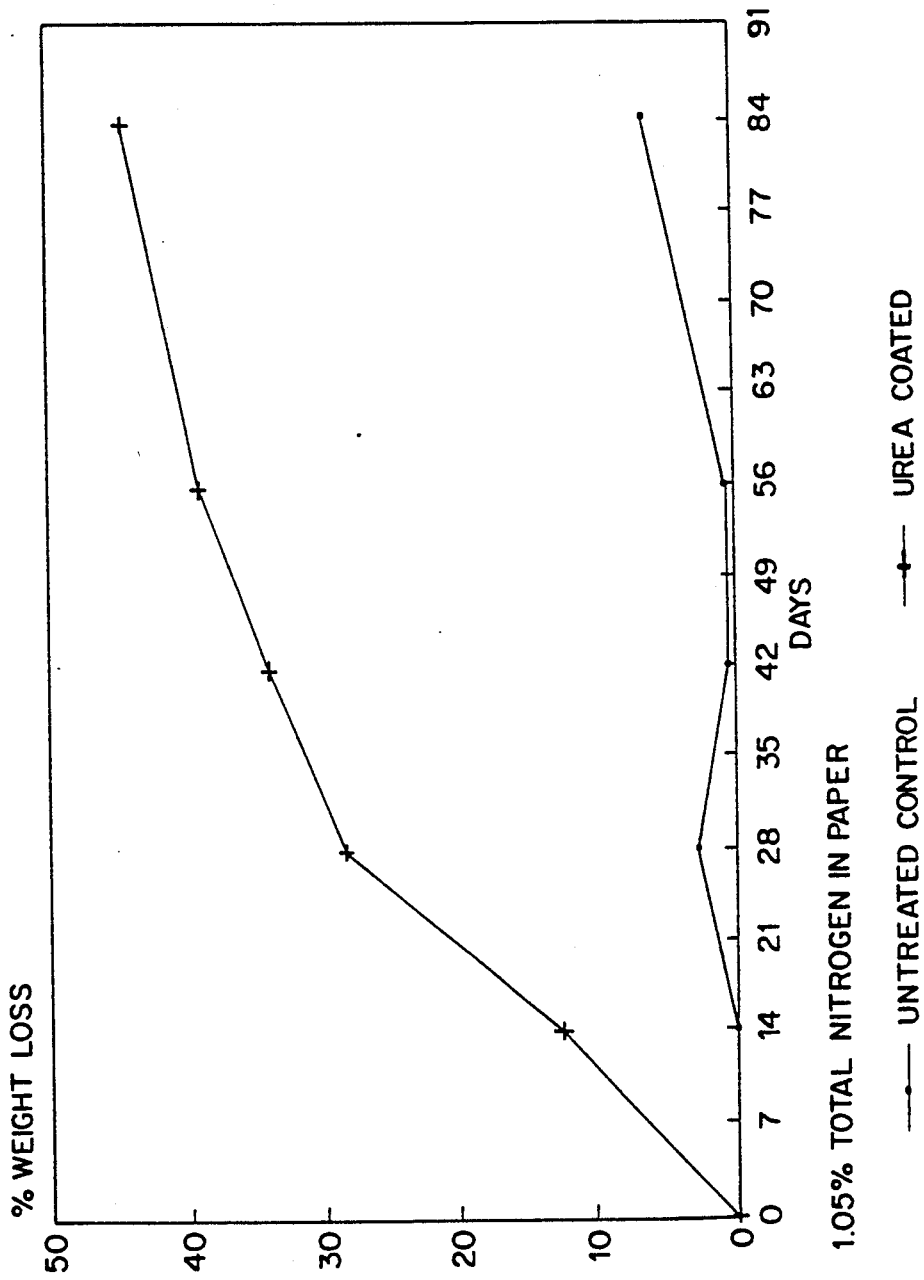

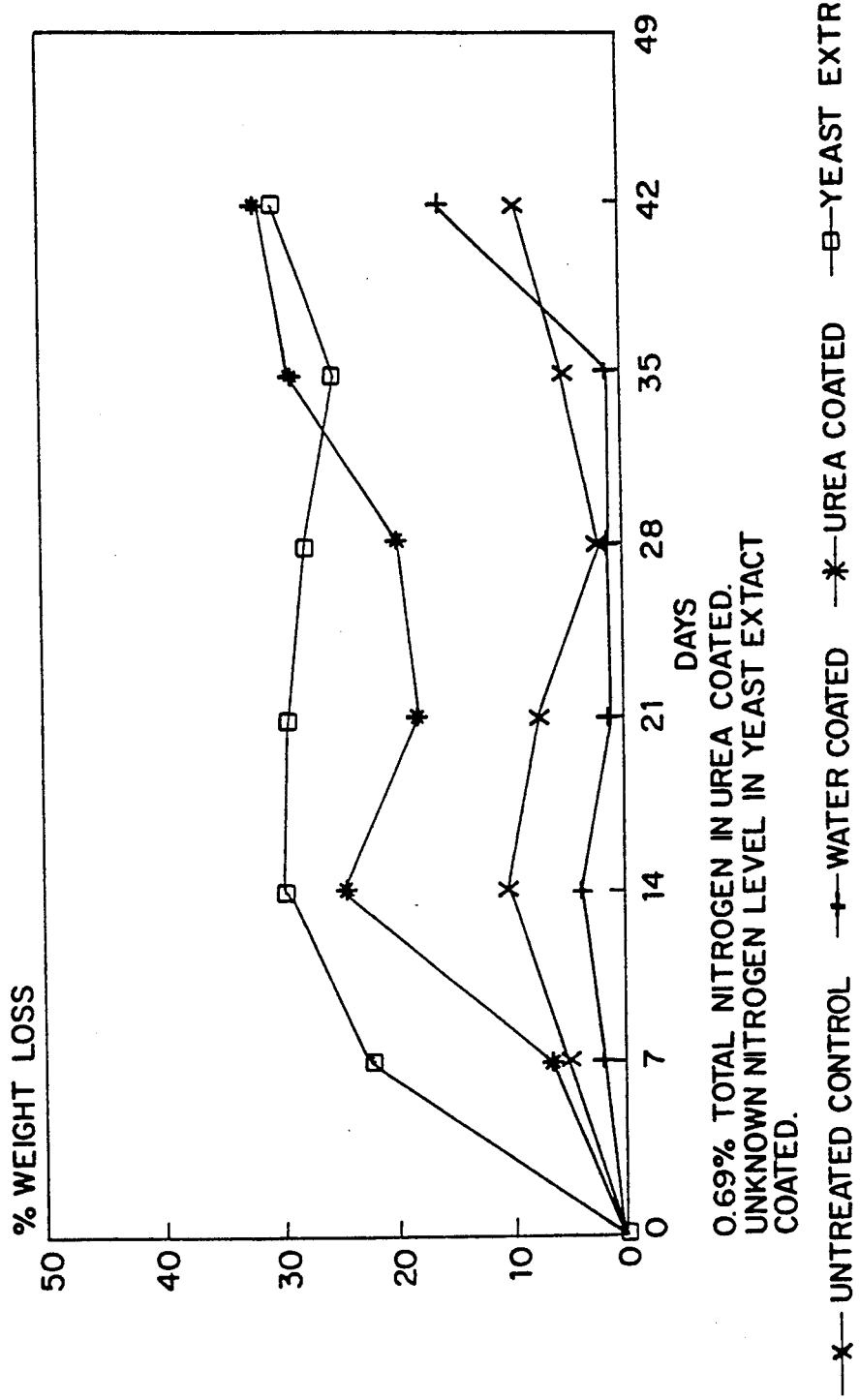

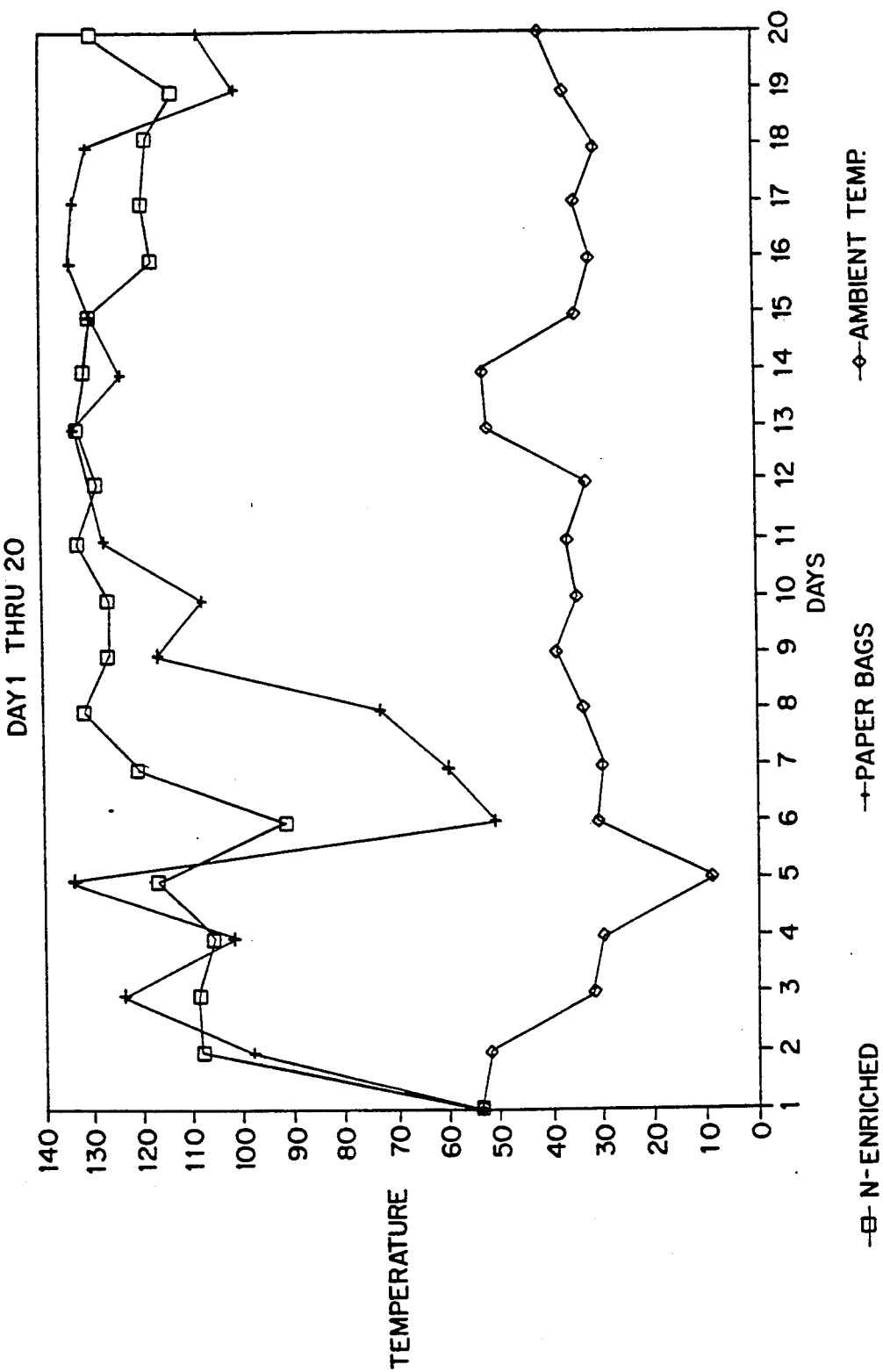

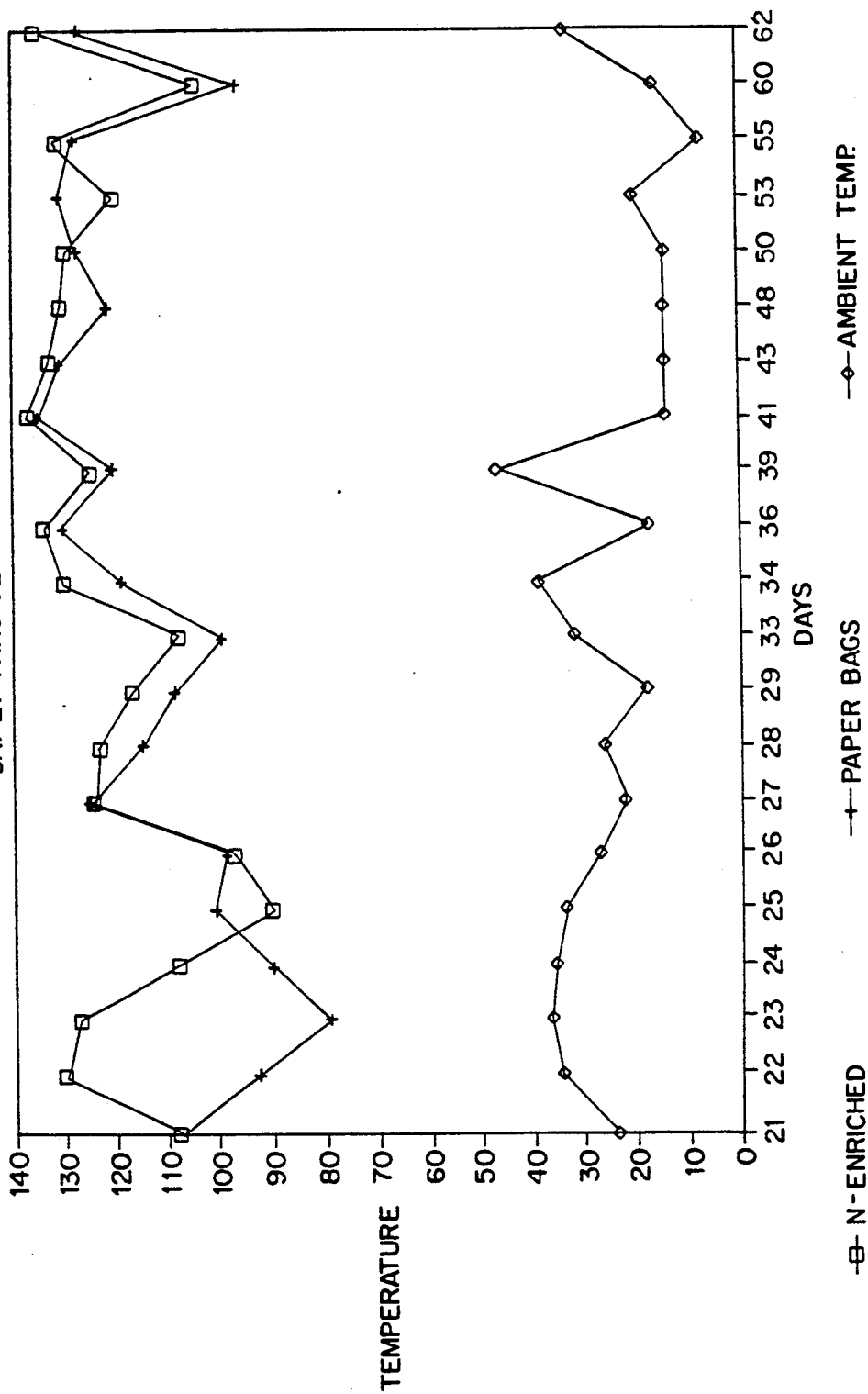

ENHANCED PAPER AND PAPERBOARD BIODEGRADABILITY

FIELD OF INVENTION

This invention generally relates to treatment of paper and paperboard with materials which increase the rate of decomposition of the paper or paperboard so treated. More particularly, it concerns methods for enhancing the biodegradability of paper and paperboard by treatment with aqueous chemical solutions which increase microbial growth on the paper or paperboard, or provide facultative anaerobic decomposition of the paper.

BACKGROUND ART

In the United States and many other industrialized countries the problem of solid waste disposal is reaching crisis proportions. A strong demand for new technologies, strategies, and materials that offer less environmentally harmful alternatives to past practices is needed. One approach to decrease the growth rate of landfills is to enhance the biodegradability of its constituent materials. As these items degrade in a landfill, they will occupy less space and allow more material to be placed in the site. A problem with this strategy is that landfills, designed to be stable systems, tend to suppress efficient physical and biological decay.

Another approach is to compost biodegradable materials at a separate site, thereby reducing the amount of waste going to the landfill from the outset. The end product of composting can be used in a variety of manners including use in lawn and garden applications. The viability of this alternative is directly dependent on the time required for sufficient biodegradation of the substrate. While paper is biodegradable under favorable conditions, the rates may be so slow that composting or biodegradation in a landfill results in no practical benefit.

Paper and paperboard, which are major contributors to the solid waste stream, are composed primarily of cellulose, a compound that lacks the nutrients essential for the proliferation of many types of saprophytic microorganisms. Saprophytic microorganisms are found in the air, soil or water and aid in the decomposition of dead or decaying plants and animals. Generally, cellulose degrades at a more rapid rate as compared to items such as plastics, synthetic fibers and other man-made materials, but the breakdown rate is too slow to result in rapid decomposition in a compost environment.

Biodegradable paper products are known in the prior art.

U.S. Pat. No. 3,645,769 to Willey et al., discloses a disposable toilet tissue impregnated with viable yeast to induce promotion of bacterial growth in septic tanks. The yeast is added onto the finished paper in either a powder or liquified form and dried.

U S. Pat. Nos. 3,647,111 and 3,800,977 to Stager, disclose a container that deteriorates after prolonged exposure to moisture and oxygen with the aid of biological agents. The biodegradable material is a laminate having an inner organic filler material layer comprising peat, wood, flour, cotton, linen or other fibrous organic material sandwiched between two outer layers comprised of a phenolic resin with a metallic salt of a fatty acid.

However, the prior art has not shown the production of biodegradable paper products which coat chemical nutrients on a paper product or incorporate chemical nutrients into the manufacture of a paper product to enhance microbial activity and thus enhance its biodegradability.

An article in the Wochenblatt fuer Papierfabrikation journal dated Jan. 30, 1984, discloses the use of microorganism control in the recycling of paper products. Biodegradable organic materials such as starch, nitrogen, phosphate, sulphate, nitrate, calcium and magnesium salts are contained in the process water and used as nutrient sources by anaerobic microorganisms to control the problems of slime, odor and corrosion during the manufacture of paper products. This reference, however, does not disclose methods for coating chemical nutrients on a paper product or incorporating chemical nutrients in the manufacture of a paper product to enhance microbial activity and thus enhancing its biodegradability.

There is a need in the art for processes which enhance the biodegradability of paper products. This invention is directed to provision of such processes which have diverse applications in curbing the solid waste crisis. It will be appreciated that advantage would be obtained by providing methods for the enhancement of the biodegradability of paper in a litter situation which would provide numerous societal benefits. A means of ensuring and enhancing the rate of biodegradability of paper and paperboard waste components will allow treatment of these materials differently than taking up valuable landfill space.

Accordingly, it is a broad object of the invention to enhance the rate of biodegradability of paper and paperboard by treating such paper or paperboard with chemical solutions, having properties which increase the decomposition of the paper fiber constituents, such that the chemical solutions are absorbed and retained by the paper or paperboard. Alternatively, the chemical solutions are incorporated into a fibrous slurry and formed into such paper or paperboard using paper making apparatus.

A more specific object of the invention is to provide a method which enhances the biodegradability of paper and paperboard by treating such paper or paperboard with chemical solutions which are a source of alternate electron acceptors for facultative anaerobic decomposition of the paper or paperboard.

Another object of the invention is to provide a method which enhances the biodegradability of paper and paperboard by treating such paper or paperboard with chemical solutions which are nutrient chemicals that increase microbial growth on the paper or paperboard.

A further object of the invention is to provide a method which enhances the biodegradability of paper and paperboard while retaining the strength and flexibility of the untreated paper.

A further specific object of the invention is to provide a method for producing biodegradable paper which is less complex and improved over the prior art.

DISCLOSURE OF THE INVENTION

In the present invention, these purposes, as well as others which will be apparent, are achieved generally by enhancing the rate of biodegradability of paper and paperboard by treating the paper or paperboard with chemical solutions, having properties which increase the decomposition of the paper fiber constituents. The chemical solutions are comprised of alternate electron acceptors for facultative anaerobic decomposition or chemical nutrients that increase microbial growth on and thus decomposition of, the paper or board so treated. Process and reaction conditions are controlled so that the aqueous chemical solution is absorbed and retained by the paper or paperboard and is thereafter dried.

Alternatively, the chemical solutions are incorporated into a slurry of fibrous based material and formed into a paper product using paper making apparatus.

Nutrient chemicals for enhancing anaerobic or aerobic degradation employed in the invention include nitrates, sulfates, potassium, phosphate, other nitrogenous sources or micronutrient sources. Other nitrogenous sources include urea, whey protein, or soluble plant food. Manganese sulfate, magnesium sulfate and other compounds containing iron, boron or calcium are among some of the micronutrient sources used in the invention. Other chemicals which serve as a source of electron donor or microbial nutrient also may be used.

Nitrogenous sources are added to the paper or paperboard in the ratio of 1 part nitrogen to 12 to 30 or more parts paper or paperboard. Potassium, phosphorous, and other micronutrients are added in lower amounts than nitrogen.

Preferred applications of the materials of the invention include use in the production of nitrogen enriched paper, having enhanced rates of degradation, which can be formed into paper bags used to collect and dispose of leaf and yard waste. As used in these applications, the materials of invention may be coated, by applying at a press size, calendar stack or in a printing operation.

Advantageously, the method for enhancing the biodegradability of paper and paperboard by treatment with nutrient chemical solutions which are absorbed and retained by the paper or paperboard is less complex than prior methods. Further advantage is obtained by adjusting the add-on levels of the nutrient chemical solutions to give the highest rate of biodegradation while retaining the strength and flexibility of the paper or paperboard so treated.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 3 illustrates the effect of high nutrient add-on levels on the biodegradation of 40 lb/3 MSF unbleached paper under the reaction conditions of Example I;

FIG. 4 illustrates the effect of high nutrient add-on levels on the biodegradation of 30 lb/3 MSF bleached paper under the reaction conditions of Example I;

FIG. 6 illustrates the effect of urea coating on the biodegradability of paper under the reaction conditions of Example III;

FIG. 7 illustrates the effect of urea and yeast extract coating on the biodegradability of 33 lb/3MSF bleached paper under the reaction conditions of Example IV; and FIGS. 8 and 9 are graphic illustrations of daily composting temperatures of nitrogen enriched paper bags and non nitrogen enriched paper bags under the reaction conditions of Example V.

DETAILED DESCRIPTION OF THE PREFERRED EMBODIMENT

As used in the specification the term biodegradable refers to a substance that can be decomposed by biological action. The invention enhances biodegradability by increasing the rate at which a substrate, such as paper or paperboard, decomposes through treatment with aqueous chemical solutions either applied to a substrate surface or incorporated into a slurry of fibrous based material and formed into a paper product using paper making apparatus. The chemical solutions consist of chemicals which supply nutrients necessary for production of cell biomass or chemicals which provide a source of alternate electron acceptors which enhance biodegradability of the substrates by, respectively, increasing microbial growth on the paper or paperboard or through facultative anaerobic decomposition. Facultative anaerobic decomposition refers to decomposition which is accomplished by a group of bacteria which prefer an oxygen atmosphere but can live in its absence.

Figure 1:
FIG. 1 is a diagrammatic view of the process for enhancing the biodegradability of paper and paperboard.

With further reference to the drawings, FIG. 1 is a diagrammatic view of the process steps for the treatment of paper and paperboard to enhance biodegradability.

A substrate comprised of paper or paperboard is provided at station 1. At station 2, the paper or paperboard is treated with an aqueous solution of chemicals, having properties which increase the decomposition of the paper fiber constituents. The chemical solution is absorbed and retained by the paper or paperboard and is thereafter dried at station 3, whereby the chemical solution is substantially imparted to the paper or paperboard and formed into a paper product having enhanced biodegradability.

Alternatively, the aqueous chemical solution is incorporated directly in a slurry of fibrous based material. Accordingly, the resulting material, having enhanced biodegradability, is formed into a paper product using paper making apparatus.

Figure 2:
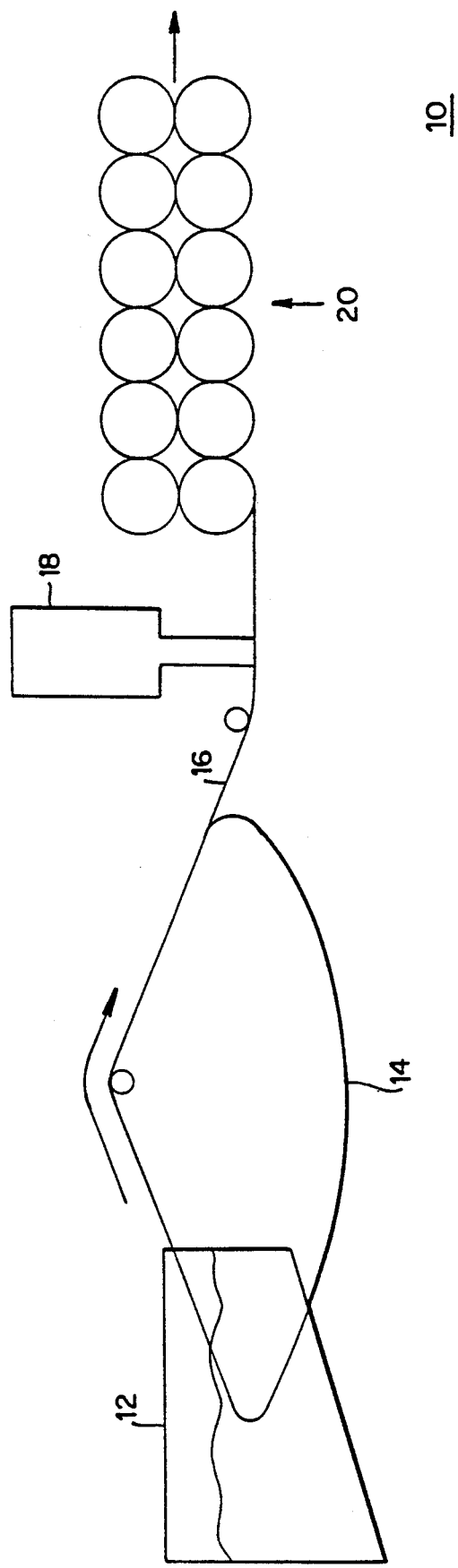
FIG. 2 is a schematic view of an apparatus for treating a substrate in accordance with the process of FIG. 1.

FIG. 2 is a schematic view of an apparatus, generally designated 10, for treating a substrate with an aqueous chemical solution, having properties which increase the decomposition of paper fiber constituents. In a preferred embodiment of the invention, the substrate used is paper or paperboard. Table I presents various types of paper or paperboard which may be used in this invention.

TABLE I

| TYPES OF PAPER OR PAPERBOARD |
|---|
| 30 lb/3MSF Bleached Bagstock |
| 50 lb/3MSF Unbleached Bagstock |
| 126 lb/3MSF Unbleached Linerboard |
| 40 lb/3MSF Unbleached Paper |
| Bleached or Unbleached Paperboard |

As shown in FIG. 2, the substrate is formed from a fibrous slurry in headbox 12. A web 16 is formed by machine 14 using a wet-lay process in accordance with conventional papermaking techniques. The web is then treated with an aqueous solution of chemicals, having properties which increase the decomposition of the substrate, 18. The chemical solutions are absorbed and retained by the substrate. Thereafter, the web 16 enters a stack of drying rollers 20, which remove water from the web. The dried web 16 is then wound up on a reel (not shown in FIG. 2) for further processing. Additionally, the web may be hot calendared to produce sheets having desired biodegradable properties.

Figure 2A:
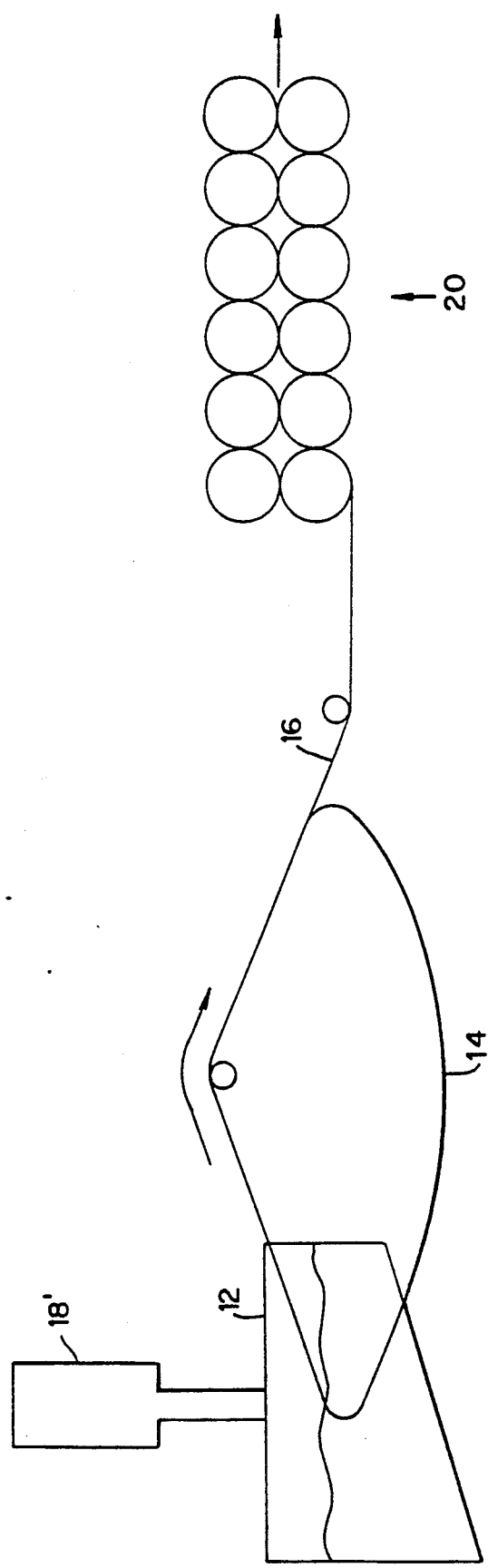
FIG. 2A is a schematic view of an apparatus for manufacture of the treated paper or paperboard of the invention in accordance with the process of FIG. 1.

Alternatively, as shown in FIG. 2A, the aqueous chemical solution, 18', is applied to the fibrous slurry, 12, at the headbox on the paper machine and is incorporated directly into web formation, 16, by machine, 14 using a wet-lay process in accordance with conventional papermaking techniques. Thereafter, the web 16 enters a stack of drying rollers 20, which remove water from the web. The dried web 16 is then wound up on a reel (not shown in FIG. 2A) for further processing. Additionally, the web may be hot calendared to produce sheets having desired biodegradable properties.

The aqueous chemical solutions can be comprised of alternate electron acceptors for facultative anaerobic decomposition or chemical nutrients that increase microbial growth on, and thus decomposition of, the paper or board so treated.

Many microbial species rely on oxidative phosphorylation for optimum generation of energy by metabolism of reduced carbon substrates. Atmospheric oxygen accepts electrons from these reduced carbon compounds in the process of generating energy, resulting in the conversion of oxygen to water. In the absence of oxygen, these organisms are capable of using alternate electron acceptors to generate energy and thus to grow. In this facultative anaerobic decomposition, bacteria may use inorganic compounds such as nitrates or sulfates as alternate electron acceptors, or organic compounds such as acetate, alcohol, and other partially-reduced carbon compounds. Under these conditions, nitrates, sulfates, and other organic compounds are not assimilated directly in cell biomass for growth, as would be the case when oxygen is present.

If oxygen is present, the chemical nutrients used in the invention are necessary for protein or nucleic acid production as well as cell wall synthesis, thereby resulting in microbial growth. In this instance, the chemical nutrients are directly incorporated into cellular components necessary for metabolism and growth.

Process and reaction conditions are controlled so that the aqueous chemical solution is absorbed and retained by the paper or paperboard and is thereafter dried in accordance with the process line of FIG. 2. Process conditions and parameters for applying the aqueous chemical solutions are dependent upon the means of application. Application can be by size press, gravure or lithographic, doctor blade, rod coating or other suitable means. Chemical concentrations of the coatings depend on the application method used and the basis weight of the substrate. Temperatures, pH of the coatings, the time of contact, and other process parameters are also dependent on the type of application method used and are standard practices in the industry.

Alternatively, the chemical solutions are incorporated into a slurry of fibrous based material and formed into a paper product using paper making apparatus in accordance with the process line of FIG. 2A.

Standard papermaking methods of adding chemical treatments to slurries of fibrous based materials can be used. Nutrients are added to the slurry in amounts dependent upon the solid content of the slurry and desired final concentrations of the nutrients. Retention aids are used to increase the adsorption of nutrients onto the fiber surfaces and to prevent loss of chemicals during the papermaking process.

Nutrient chemicals for enhancing aerobic and/or anaerobic degradation employed in the invention include nitrates, sulfates, potassium, phosphate, other nitrogenous sources or micronutrient sources. Other nitrogenous sources may include urea, whey protein, reduced nitrogen salts, or soluble plant food. Manganese sulfate, magnesium sulfate and other compounds containing iron, boron or calcium are among some of the micronutrient sources used in the invention. Other chemicals which serve as a source of electron donor or microbial nutrient also may be used.

Nitrogenous sources are added to the paper or paperboard in the ratio of 1 part nitrogen to 12 to 30 or more parts paper or paperboard. Potassium, phosphorous, and other micronutrients are added in lower amounts than nitrogen.

In Examples I through IV materials of the invention were produced on a prototype process line simulating process conditions for bulk production of the material as shown in FIG. 2 and 2A. The rate of biodegradation was measured by analyzing weight loss over time of the samples buried in a soil mixture comprised primarily of vermiculite. The use of vermiculite as the burial media eliminates any effects that growth promoting substances found in the soil might have on the rates of biodegradability of the samples. Vermiculite has the following chemical composition:

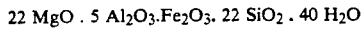

$$22\ MgO \cdot 5\ Al_2O_3 \cdot Fe_2O_3 \cdot 22\ SiO_2 \cdot 40\ H_2O$$

Examples I-IV demonstrate the enhanced biodegradation of paper by coating it with various microbial nutrients, which are provided in whey protein, urea, plant food or yeast extract, and are normally absent in cellulose.

The enhanced rates of biodegradation observed are not limited to the soil environment or the microbial nutrients in Examples I through IV but extend also to other environments that favor microbial activity, such as a compost pile, as shown in Example V, and to other microbial nutrient sources.

In Example V the composting process of paper bags was monitored. Samples of nitrogen enriched paper, having enhanced rates of degradation, were formed into paper bags used to collect and dispose of leaf and yard waste.

EXAMPLE I

Samples of 40 lb/3 MSF unbleached and 30 lb/3 MSF bleached paper were treated with aqueous chemical solutions and buried in vermiculite for up to four weeks. The aqueous chemical solutions were composed of the following chemical constituents:

whey protein from CalPro Ingredients Company, Corona, Ca., containing 12% nitrogen;

Agway urea fertilizer from Agway, Syracuse, NY., containing 46% nitrogen; and

Agway Acid-Green plant food from Agway, Syracuse, N.Y., containing 30% nitrogen.

Aqueous solutions containing 50% and 33% by weight of the chemical constituents were applied with a #4 drawdown rod to 11"×11" sheets of the unbleached and bleached paper. Treatments yielded the following dry coating weights as shown in Table II, expressed as a % of the total weight of the paper and coating. As a control, untreated sheets of the unbleached and bleached paper were treated with deionized water.

TABLE II

EXAMPLE I DRY COATING WEIGHTS
(% OF TOTAL WEIGHT OF PAPER AND COATING)

| AQUEOUS COATING | 40 lb/3MSF UNBLEACHED PAPER | 30 lb/3MSF BLEACHED PAPER |
|---|---|---|
| 50% WHEY PROTEIN | 39% | 51% |
| 33% WHEY PROTEIN | 20% | 21% |
| 50% UREA | 24% | 33% |
| 33% UREA | 16% | 26% |
| 50% PLANT FOOD | 28% | 30% |
| 33% PLANT FOOD | 15% | 21% |

These sheets were cut into 2"×2" squares. Seven preweighed samples of each type were then buried in 7" wide, 22" long, 5" deep, planting trays filled with vermiculite. Microorganisms were introduced into the vermiculite by adding 3 liters of an inoculum to each tray. The inoculum was produced by combining 4 kg of topsoil with an equal amount of distilled water for 24 hours. The liquid portion was then passed through filter paper to remove soil particles, and diluted with 5 parts of distilled water. Each week 2 liters of distilled water was added to each tray. The trays were held in an incubator set at 25° C. On the 14th, 21st, and 28th day, one sample of each type was removed from its tray, cleaned and weighed. The percent weight loss for each sample was determined by dividing its post-incubation weight by its initial weight.

EXAMPLE II

Concentrations of the aqueous urea and plant food solutions used in Example I were reduced to ascertain the effects of lower add-on levels to paper. 12"×12" sheets of 50 lb/3 MSF unbleached paper were coated with 6.4%, 7.1%, and 13% by weight urea solutions, and 10%, 13%, and 20% by weight plant food solutions. The dry coating weights of each sample, expressed as a % of the total weight of paper and coating, is shown in Table III below.

TABLE III

EXAMPLE II DRY COATING WEIGHTS
(% OF TOTAL WEIGHT OF PAPER AND COATING)

| AQUEOUS COATING | 50 lb/3MSF UNBLEACHED PAPER |
|---|---|
| 6.4% UREA | 3% |
| 7.1% UREA | 4% |
| 13% UREA | 6% |
| 10% PLANT FOOD | 6% |
| 13% PLANT FOOD | 12% |
| 20% PLANT FOOD | 11% |

The sheets were cut into 2"×2" squares. These samples were weighed, placed in fine mesh stainless steel screens to aid in their recovery, and subsequently placed in vermiculite filled trays and incubated as described in Example I. Watering was reduced to 500 ml/tray/week. Each treatment was analyzed for weight loss after 7, 14, 21, 35, and 49 days of burial.

EXAMPLE III

Samples of 50 lb/3 MSF unbleached kraft paper were coated with a concentration of aqueous urea solution at an add-on level of 1.1 lb urea/3 MSF, applied at a size press. The samples were analyzed for weight loss after 14, 28, 42, 56 and 85 days of burial in a manner in accordance with Example I. Analysis of urea coated paper prior to burial indicated a total nitrogen level of 1.05%.

Table IV presented below compares the physical properties of the treated paperboard of Example III to a control of untreated paperboard.

TABLE IV

PHYSICAL PROPERTIES OF
50 lb/3MSF KRAFT PAPER WITH UREA

| TEST METHOD | CONTROL | TREATED |
|---|---|---|
| Basis Weight (g/sg M) | 80.3 | 86.6 |
| Caliper | 5.45 | 4.71 |
| ASV (cc/gm) | 1.72 | 1.38 |
| Mullen (psi) | 44.6 | 60.6 |
| Tear (gram) | | |
| MD | 98.8 | 94.0 |
| CD | 101.6 | 94.8 |
| Taber Stiffness (g-cm) | | |
| MD | 2.77 | 3.2 |
| CD | 1.2 | 1.6 |
| Scott Internal Bond (1E-3 ft-lb) | | |
| MD | 279 | 334 |
| CD | 295 | 330.5 |
| Tensile (lb/in) | | |
| MD | 34.3 | 43.3 |
| CD | 20.4 | 30.3 |
| Tensile energy adsorption (in-lb/sq in) | | |
| MD | 0.455 | 0.522 |
| CD | 0.815 | 1.26 |
| Modulus of elasticity (psi × 1000) | | |
| MD | 433 | 627 |
| CD | 199 | 326 |

EXAMPLE IV

A total of 24 pre-weighed samples of 33 lb/#MSF bleached paper were individually buried in 12 oz polystyrene tubs containing a mixture of 50% vermiculite, 25% peat moss, 16% cow manure, and 9% topsoil. The 24 samples were treated as follows: 6 samples were coated with water; 6 samples were coated with a urea solution; 6 samples were coated with a yeast extract solution and 6 samples were untreated. The urea coated samples revealed a nitrogen content of 0.69%. The yeast extract samples were prepared by dipping base stock in a 10% yeast extract solution, yielding a dry add-on level of 3% yeast extract by weight. Deionized water (25 ml) was added to each container initially and thereafter on a weekly basis. Each week, one sample from each of the four types was removed from its container, cleaned and weighed. The resulting weight loss was used for determining the extent of biodegradation.

EXAMPLE V

The composting process of paper bags was monitored. Two separate samples were prepared based on 50 lb/3 MSF unbleached kraft paper as set forth in Example III. Sample A was constructed using paper bags which were nitrogen enriched and sample B was created from a standard papermaking process and formed into Garbax bags (non nitrogen enriched). Each sample contained approximately 9 tons of leaves (50 cubic yards) and 255 lbs of shredded paper bags (500 paper bags, or about 2 cubic yards). The materials were stirred with a Scarab-type turner to create a homogeneous mixture of the materials. No water or inoculant was added to the initial compost mixture. Four days later the samples were turned again with the Scarab-type turner. Thereafter the samples were turned once only per month using a front-end loader. The temperature of the samples were monitored daily for the first 30 days and thereafter three times per week. The daily pile temperature was calculated on the average of three individual temperature measurements which were taken at equally spaced intervals along the length of the piles at a depth of approximately 24".

Samples of each of the constituents, leaves, plain paper and nitrogen enriched paper, were analyzed for pH, total solids (TS), total volatile solids (TVS), total Kjeldahl nitrogen (TKN), and total carbon. Total Kjeldahl nitrogen measures total amount of nitrogen, reduced and oxidized, in a sample, and states how much available nitrogen exists.

Table V presented below lists the initial characteristics of the individual pile constituents. The nitrogen enriched paper material was found to contain less than 0.70% TKN. Table VI illustrates the results of periodic analyses of the individual samples.

TABLE V

CONSTITUENT PROPERTIES OF EXAMPLE V

| CONSTITUENT | pH | % TOTAL SOLID | % TOTAL VOL. SOLIDS | % CARBON | % TKN | C:N RATIO |
|---|---|---|---|---|---|---|
| LEAVES | 4.81 | 53.58 | 70.28 | 45.0 | .762 | 59:1 |
| STANDARD PAPER | 5.35 | 93.04 | 98.93 | 44.7 | .066 | 677:1 |
| NITROGEN ENRICHED PAPER | 5.82 | 93.43 | 99.57 | 44.3 | .663 | 65:1 |

NOTE: All results reported are on a dry weight basis.

TABLE VI

ANALYSIS OF EXAMPLE V

| SAMPLE | DAY | pH | % TOTAL SOLIDS | % TOTAL VOL. SOLIDS | % TKN | DENSITY lbs/CY |
|---|---|---|---|---|---|---|
| SAMPLE A | 5 | 4.72 | 52.09 | 86.30 | .833 | 118 |
| SAMPLE A | 13 | 5.66 | 52.09 | 75.20 | 1.037 | 152 |
| SAMPLE A | 33 | 5.40 | 33.41 | 83.14 | 1.389 | 337 |
| SAMPLE B | 5 | 5.00 | 34.55 | 71.47 | .857 | 202 |
| SAMPLE B | 13 | 5.84 | 43.97 | 77.37 | .934 | 303 |
| SAMPLE B | 33 | 4.28 | 30.90 | 80.19 | 1.073 | 455 |

NOTE: All results reported are on a dry weight basis.

In both samples A and B, the nitrogen levels rose significantly over time, but at Day 33 the nitrogen enriched paper became significantly higher than the standard non nitrogen enriched paper. The density of both samples steadily increased over time which is an expected result during the normal composting of leaves.

As shown in the above Examples I through V, nitrogenous compounds are the preferred chemical constituents employed in the invention to enhance paper biodegradation. Cellulose, the major constituent in paper, is potentially an excellent substrate for microbial activity due to the abundant supply of reduced carbon, but cellulose by itself is relatively resistant to biodegradation because it lacks certain elements necessary to sustain the growth of microorganisms. The microbial decomposition of cellulose is mostly retarded by its deficiency of nitrogen, hence the addition of nitrogenous compounds increases microbial growth and enhances paper biodegradation.

FIGS. 3 and 4, show the effect of nutrient add-on levels on the biodegradation of 40 lb/3 MSF unbleached paper and 30 lb/3 MSF bleached paper prepared in accordance with Example I. The average weight loss of the paper was almost twice that of the control after two weeks of burial. After four weeks of burial the average weight loss of the paper was 22% greater than the control.

Figure 5:
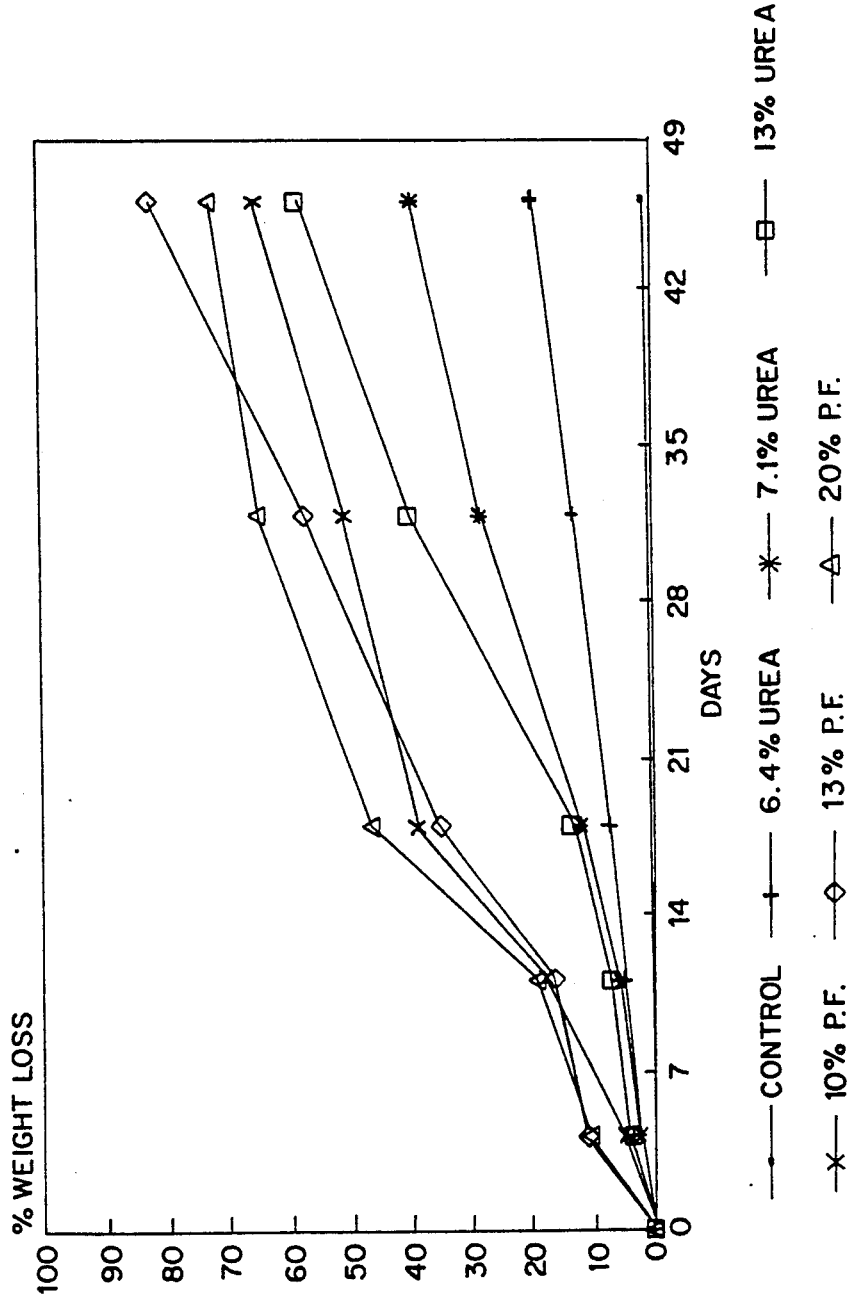
FIG. 5 illustrates the effect of low nutrient add-on levels on the biodegradation of 50 lb/3MSF unbleached paper under the reaction conditions of Example II.

In Example II concentrations of aqueous urea and plant food coatings were greatly reduced, and whey protein was eliminated due to its low nitrogen content and high cost. As shown in FIG. 5, such treatments resulted in an acceleration in the rate of biodegradation of the treated samples. After 46 days of burial, the average weight loss of the treated samples was over 40 times that of the control.

FIG. 6 shows the effect of urea coatings on the biodegradation of paper as prepared in accordance with Example III. The biodegradation rate of the coated paper was significantly greater than that of the control. After 85 days of burial, the average weight loss of the treated samples was over 7 times that of the untreated.

In Example IV, treatments with urea and yeast extract coatings substantially accelerated the biodegradation process of paper as shown in FIG. 7. After 42 days of burial, both treated samples showed a weight loss of over two times that of the control samples.

FIGS. 8 and 9 are graphic illustrations of the daily temperature data for both sample A and B of Example V. Both samples maintained temperatures characteristic of thermophilic composting activity. Thermophilic microorganisms optimum growth temperatures are in the range of 25° to 60° C.

The nitrogen enriched paper bags showed evidence of enhanced composting activity. This is supported by higher total nitrogen levels and generally higher pile temperatures in samples with treated paper indicating a more active microbial consortium.

Examples I through V demonstrate that treating paper with various nitrogenous substances significantly accelerates its rate of biodegradation. Urea is the preferred material for enhancing the biodegradation of paper because of its relatively low cost, its availability and its high nitrogen content (46%). It is also highly soluble in water, non-toxic and relatively easy to apply to paper. A carbon:nitrogen ratio of 24:1 is optimal for microbial degradation in composting environments. For treating paper, this ratio translates to an add-on level of 80 lb of urea/ton. Size press application is the most cost effective method of application but any method of applications that can achieve this add-on level can be used.

From the foregoing, it will be appreciated that the invention achieves the objects stated heretofore. Paper products are provided with enhanced biodegradability properties. The method for production of the invention obtains enhanced decomposition of paper products without impairing its strength and flexibility.

Advantageously, the treated paper or paperboard may be employed on conventional process lines without requirement of extensive retooling. The method for producing biodegradable paper products is less complex than multi-step processes for the decomposition of paper fiber constituents.

In addition, the utilization of conventional process lines and enhanced biodegradability of paper and paperboard provide low cost and environmentally conscious food packaging. In particular fiber freeness, the basis weight, and relative amounts of the chemical solutions can be varied to increase rates of decomposition of different types of paper products.

It will be recognized by those skilled in the art that the invention and process have wide application in the production of a diversity of paper or paper-like products.

Numerous modifications are possible in light of the above disclosure. For example, such as the production of nitrogen enriched paper bags, having enhanced composting properties, for use in the collection and disposal of leaf and yard waste.

As another application of the invention, nitrogen enriched bags or paperboard targeted for the fast food industry could be placed in a composting situation where enhanced biodegradation would be beneficial. The use of nutrient additions that bind tightly to cellulose fibers could be used to enhance the decomposition of items typically found in litter, such as bags, bottle carriers, fast food packaging, etc. The addition of alternate electron acceptors such as nitrates, sulfates and carbonates to certain paper products would enhance their decomposition in landfills, since most landfills lack available oxygen.

Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. A paper product having enhanced biodegradability comprising:
    a substrate comprised of a fibrous based material, with a chemical constituent,
    said chemical constituent is a nutrient chemical selected from the group comprising nitrates, sulfates, potassium, phosphate, other nitrogenous sources and micronutrient sources, that increases microbial growth on said substrate;
    wherein said chemical constituent is absorbed and retained in said substrate; and
    said chemical constituent has properties which increase the decomposition of said substrate.

2. A paper product as defined in claim 1, wherein said fibrous based material with said chemical constituent is formed into a paper product using paper making apparatus.

3. A paper product as defined in claim 1, wherein said substrate is between 90 to 99.5 wt.% and said chemical constituent is between 10 to 0.5 wt.%.

4. The paper product as defined in claim 1, wherein said substrate comprises paper or paperboard.

5. A paper product having enhanced biodegradability comprising:
    a substrate comprised of a fibrous based material, with a chemical constituent,
    said chemical constituent is an alternate electron acceptor selected from the group comprising nitrates, sulfates, acetate, alcohol, carbonates and partiallyreduced carbon compounds, for facultative anaerobic decomposition of said substrate;
    wherein said chemical constituent is absorbed and retained in said substrate; and
    said chemical constituent has properties which increases the decomposition of said substrate.

6. A paper product having enhanced biodegradability comprising:
    a substrate comprised of a fibrous based material, with a chemical constituent,
    said chemical constituent is a nutrient chemical selected from the group comprising urea, whey protein, reduced nitrogen salts and soluble plant food, that increases microbial grown on said substrate;
    wherein said chemical constituent is absorbed and retained in said substrate; and
    said chemical constituent has properties which increase the decomposition of said substrate.

7. A paper product having enhanced biodegradability comprising:
    a substrate comprised of a fibrous based material, with a chemical constituent,
    said chemical constituent is a nutrient chemical selected form the group comprising manganese sulfate, magnesium sulfate, and other inorganic compounds containing iron, boron or calcium, that increases microbial growth on said substrate;
    wherein said chemical constituent is absorbed and retained in said substrate ;and
    said chemical constituent has properties which increases the decomposition of said substrate.

* * * * *